United States Patent
Furusho

(10) Patent No.: US 6,845,172 B2
(45) Date of Patent: Jan. 18, 2005

(54) ROAD LANE MARKER RECOGNITION

(75) Inventor: Hiroyuki Furusho, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 665 days.

(21) Appl. No.: 09/963,490

(22) Filed: Sep. 27, 2001

(65) Prior Publication Data

US 2002/0042676 A1 Apr. 11, 2002

(30) Foreign Application Priority Data

Sep. 29, 2000 (JP) .......................................... 2000-301453
Jun. 13, 2001 (JP) .......................................... 2001-179204

(51) Int. Cl.[7] .................................................. G06K 9/00
(52) U.S. Cl. ........................... 382/104; 348/113; 701/23; 701/300
(58) Field of Search ................................ 382/100, 104, 382/107, 199, 202; 340/907; 348/113; 701/23, 28, 41, 200, 300; 703/8

(56) References Cited

U.S. PATENT DOCUMENTS

| | | | | |
|---|---|---|---|---|
| 5,487,116 A | * | 1/1996 | Nakano et al. | 382/104 |
| 5,987,174 A | * | 11/1999 | Nakamura et al. | 382/199 |
| 6,466,684 B1 | * | 10/2002 | Sasaki et al. | 382/104 |
| 2002/0031242 A1 | * | 3/2002 | Yasui et al. | 382/104 |
| 2003/0099377 A1 | * | 5/2003 | Hanawa | 382/104 |

FOREIGN PATENT DOCUMENTS

| | | |
|---|---|---|
| JP | 6-20189 | 1/1994 |
| JP | 8-261756 | 10/1996 |

OTHER PUBLICATIONS

Investigation of Automatic Path Tracking Using Extended Kalman Filter (20005494), Society of Automotive Engineers of Japan (Oct. 19, 2000).*

"Investigation on Automatic Path Tracking Using Extended Kalman Filter" (20005494), Society of Automotive Engineers of Japan (Oct. 19, 2000).

* cited by examiner

*Primary Examiner*—Samir Ahmed
*Assistant Examiner*—Anand Bhatnagar
(74) *Attorney, Agent, or Firm*—Foley & Lardner LLP

(57) ABSTRACT

A road recognition apparatus estimates road parameters of a road model equation by processing a forward road image of a vehicle. A processor sets a series of windows along a road white line (or lane marker) on the forward road image, and calculates a candidate straight line segment likely to be a white line in each window. The processor further checks an accuracy in position of a candidate white line in each window. The processor estimates the road parameters from the image coordinates of the candidate white line in each or the window higher in the accuracy, and estimates the road parameters exclusive of a vehicle lateral displacement from the gradient of candidate white line in each or the window lower in the accuracy.

11 Claims, 11 Drawing Sheets

ROAD LANE MARKER RECOGNITION

BACKGROUND OF THE INVENTION

The present invention relates to technique for recognizing a road lane marker, such as a white line, ahead of a vehicle for automatic steering systems and various other applications.

Published Japanese Patent Application 6-20189 and Published Japanese Patent Application 8-261756 disclose road lane recognizing devices using forward road image ahead.

SUMMARY OF THE INVENTION

However, there are objects, such as water in a rut, guard rail, and dual white lines, which can be mistaken for a lane marker. Such an object often extends along an actual lane marker, and binary image of the object tends to lead the road geometry estimation into error.

It is therefore an object of the present invention to provide road lane marker recognition apparatus and/or method capable of estimating road geometry accurately without misrecognition.

According to the present invention, a road lane marker recognition apparatus for obtaining a forward road image of a road ahead of a vehicle with an imaging device and estimating road parameters of a road model equation, comprises:

a window setting section to set, in the road image, a plurality of windows along a road lane marker on the road so that the road lane marker is contained in each window;

a candidate lane marker calculating section to calculate a candidate lane marker which is likely to be the road lane marker in each window;

a position accuracy judging section to judge a position accuracy in position of the candidate lane marker with respect to the road lane marker in each window; and a road parameter estimating section to estimate the road parameters of the road model equation representing a road shape of the road and vehicle attitude with respect to the road, the road parameter estimating section being configured to estimate the road parameters inclusive of a vehicle lateral displacement, by using at least a gradient of the candidate lane marker for one window judged to be lower in the position accuracy, and by using an image coordinate of the candidate lane marker for one window judged to be higher in the position accuracy.

According to the present invention, a road lane marker recognition process comprises: obtaining a forward road image of a road ahead of a vehicle; setting, in the road image, a series of windows arranged along a road lane marker on the road; calculating a candidate lane marker which is likely to be the road lane marker in each window; judging a position accuracy in position of the candidate lane marker in each window; and estimating road parameters of a road model equation inclusive of a vehicle lateral displacement, by using at least a gradient of the candidate lane marker for one window judged to be lower in the position accuracy, and by using an image coordinate of the candidate lane marker for one window judged to be higher in the position accuracy.

The other objects and features of this invention will become understood from the following description with reference to the accompanying drawings.

DETAILED DESCRIPTION OF THE INVENTION

Preferred embodiments of the invention will now be described in detail with reference to the accompanying drawings.

Figure 2:
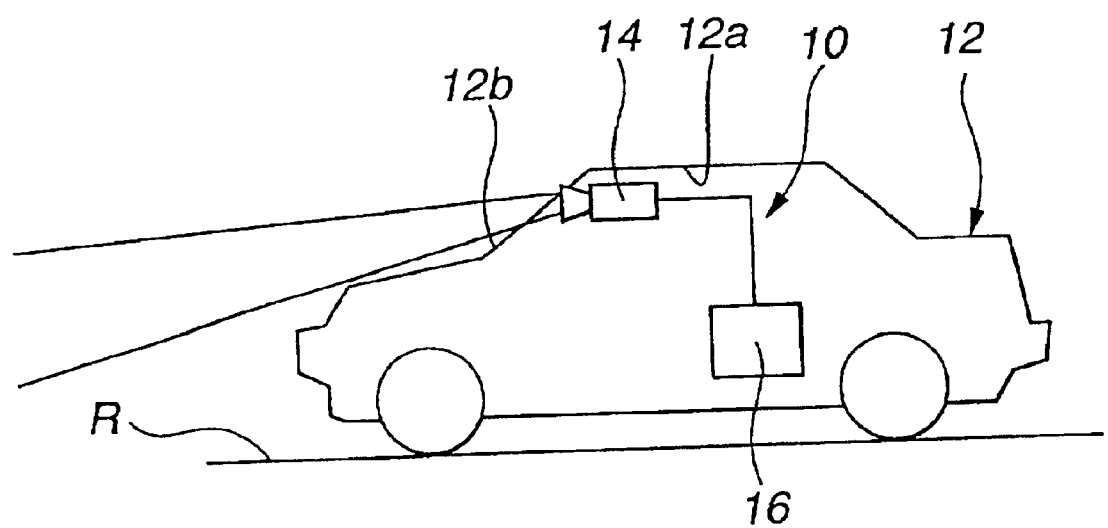
FIG. 2 is a schematic view showing a vehicle equipped with the road lane marker recognition apparatus.

FIG. 2 is a schematic view of a vehicle 12 equipped with a road lane marker (white line) recognition apparatus 10 according to an embodiment of the invention, for recognizing a road white line (or lane marker). In FIG. 2, vehicle 12 is provided with an image acquisition device (or imaging device) 14 for acquiring an image of a road in front of the vehicle and a processor 16 for processing an image signal (hereinafter simply referred to as "image") acquired by image acquisition device 14. In this example, image acquisition device 14 is a CCD camera capable of picking up images with a high sensitivity, and image acquisition device (hereinafter referred to as "camera") 14 is mounted to compartment ceiling 12a in the middle of a front part thereof such that it is directed forward and downward to acquire an image of road R in front of vehicle 12 through front glass 12b. Processor 16 is provided in an appropriate location where it is not affected by heat from vehicle 12 and wind and rain to perform control such that road white line 18 on the road is recognized from the image of road R acquired by camera 14 to estimate the shape of the road and the attitude of the vehicle relative to the road.

Figure 1:
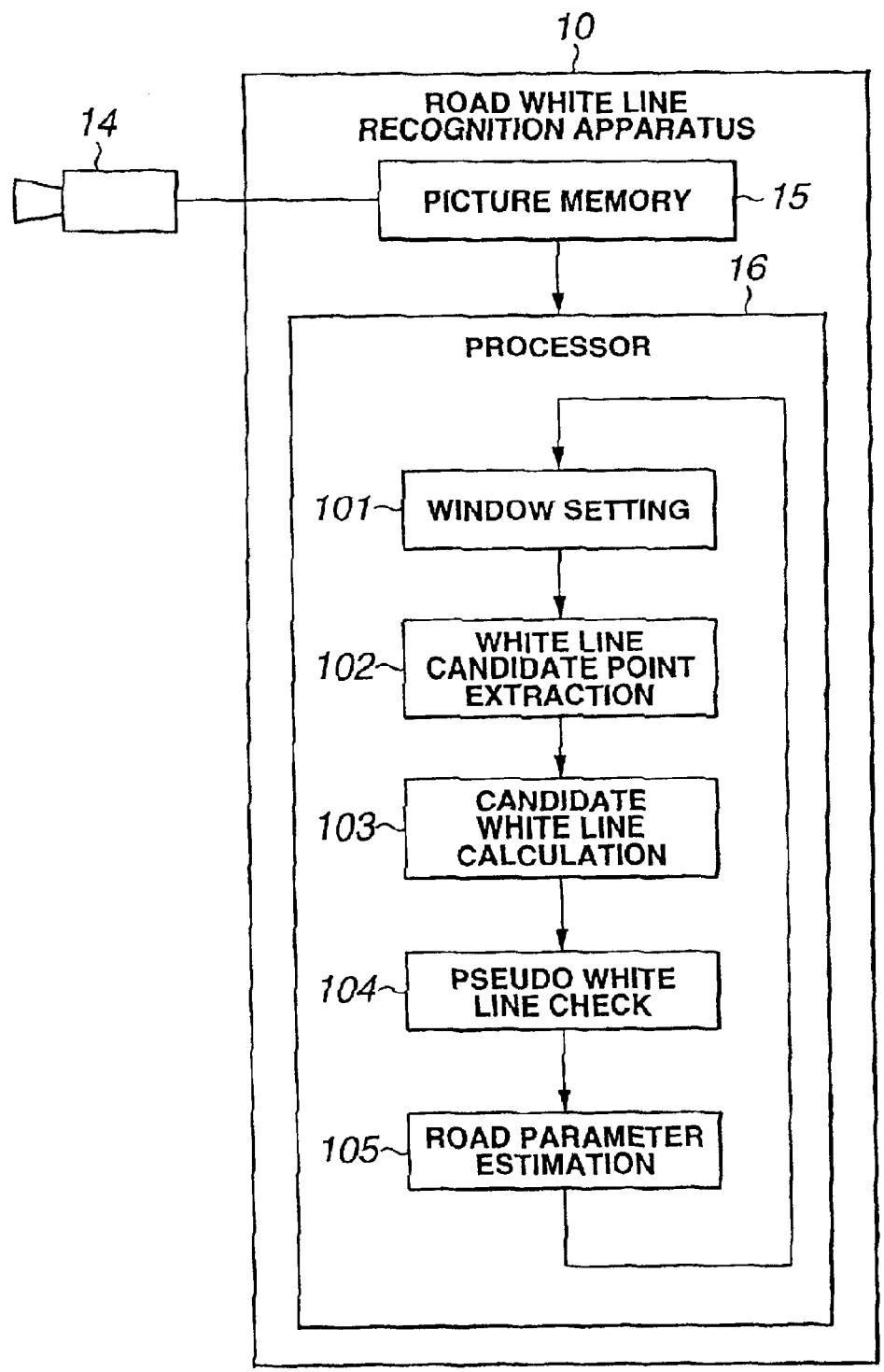
FIG. 1 is a schematic view showing a road lane marker recognition apparatus according to a first embodiment of the present invention.

FIG. 1 is a diagram showing a basic configuration of the lane marker recognition apparatus 10 according to this embodiment of the invention. In FIG. 1, road lane marker recognition apparatus 10 has a picture memory (or image memory) 15 for storing an image of a road in front of the vehicle acquired by image acquisition device 14 mounted on the vehicle, and processor 16, constituted by, in this example, a microprocessor, for estimating road parameters based on the road image stored in the image memory 15.

Processor 16 has a window setting section 101 for providing a plurality of windows on the road image stored in the image memory 15 in the direction in which a white line (or lane marker) on the road extends such that the white line on the road is included in each of the windows; a white line candidate point extracting section (or lane marker candidate point extracting section) 102 for processing the image in each of the windows to extract candidate points for a white line (or lane marker; a candidate white line calculating section (or candidate lane marker calculating section) 103 for calculating the image coordinates and gradient of a first candidate white line having the highest probability of being a white line based on the white line candidate points extracted in each of the windows; a pseudo white line (or pseudo lane marker) presence judging section (white line position accuracy judging section) 104 for judging whether a second candidate white line resembling to the first candidate white line exists or not, that is whether a pseudo white line (or pseudo lane marker) exists or not in each of the windows; and a road parameter estimation section 105 for estimating road parameters including at least lateral displacement of the vehicle relative to the lane, by using the image coordinates and gradient of the first candidate white line calculated in each of the windows and a road model equation. The sections 101 through 105 are achieved by a program control in processor 16.

Road parameter estimation section 105 estimates the road parameters including the vehicle lateral displacement relative to the lane by using the image coordinates and gradient of the first candidate white line for each of windows which are judged as having a pseudo white line (or as lower in position accuracy) and by using the image coordinates of the first candidate white line for each of windows which are judged as having no pseudo white line (or as higher in position accuracy).

Road parameter estimation section 105 of this example uses Equation 1 shown below as a road model equation to estimate the shape of the road and the attitude of the vehicle relative to the road.

$$x = \left(\frac{-A + jE_0}{H}\right)(y + f \cdot D) - \frac{B \cdot H \cdot f^2}{y + f \cdot D} - C \cdot f \quad \text{[Equation 1]}$$

A process for deriving Equation 1 for such modeling of a road is detailed in "Investigation on Automatic Path Tracking Using Extended Kalman Filter" (20005494) proposed by the inventor of the present application at the 2000 autumn meeting of Society of Automotive Engineers of Japan (Oct. 19, 2000). The entire contents of this document are hereby incorporated by reference.

Road parameters A, B, C, D, and H in Equation 1 are lateral displacement of the vehicle relative to the lane (A), the curvature of the road (B), the yaw angle of the vehicle with respect to the lane (C), the pitch angle of the vehicle (D), and the height of the image acquisition device from the road surface (H).

$E_0$ is a constant which represents the width of the lane (the distance between inner sides of left and right white lines on the left and right sides of the lane); f is a penetration conversion constant of the camera; j is a parameter for distinguishing between the left and right white lines which is 0 for the left white line (j=0) and 1 for the right white line (j=1). Coordinates (x, y) represent the location of an arbitrary point on the inner edge of the left or right white line on the image, the origin being the upper left corner of the image, the rightward direction being the positive direction of the x-axis, and the downward direction being the positive direction of the y-axis.

Thus, Equation 1 represents a road model. However, various modifications. For example, $E_0$ may be a variable; and H may be fixed. The lane width may be the distance between the centers of the left and right white lines; and (x, y) may be defined as the image coordinates at the middle of the white line width.

Figure 3:
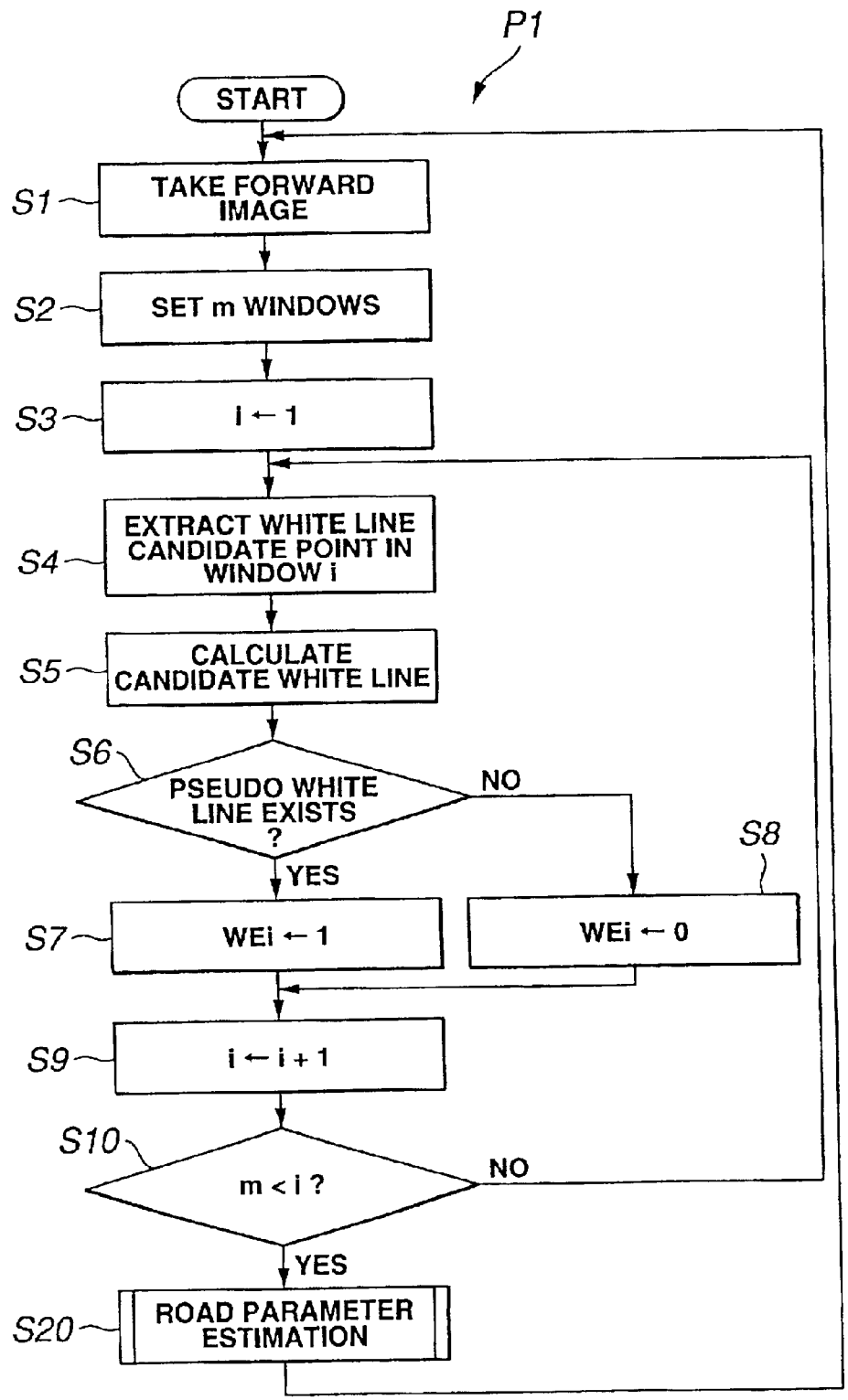
FIG. 3 is a flowchart of an image processing program according to the first embodiment.
Figure 4:
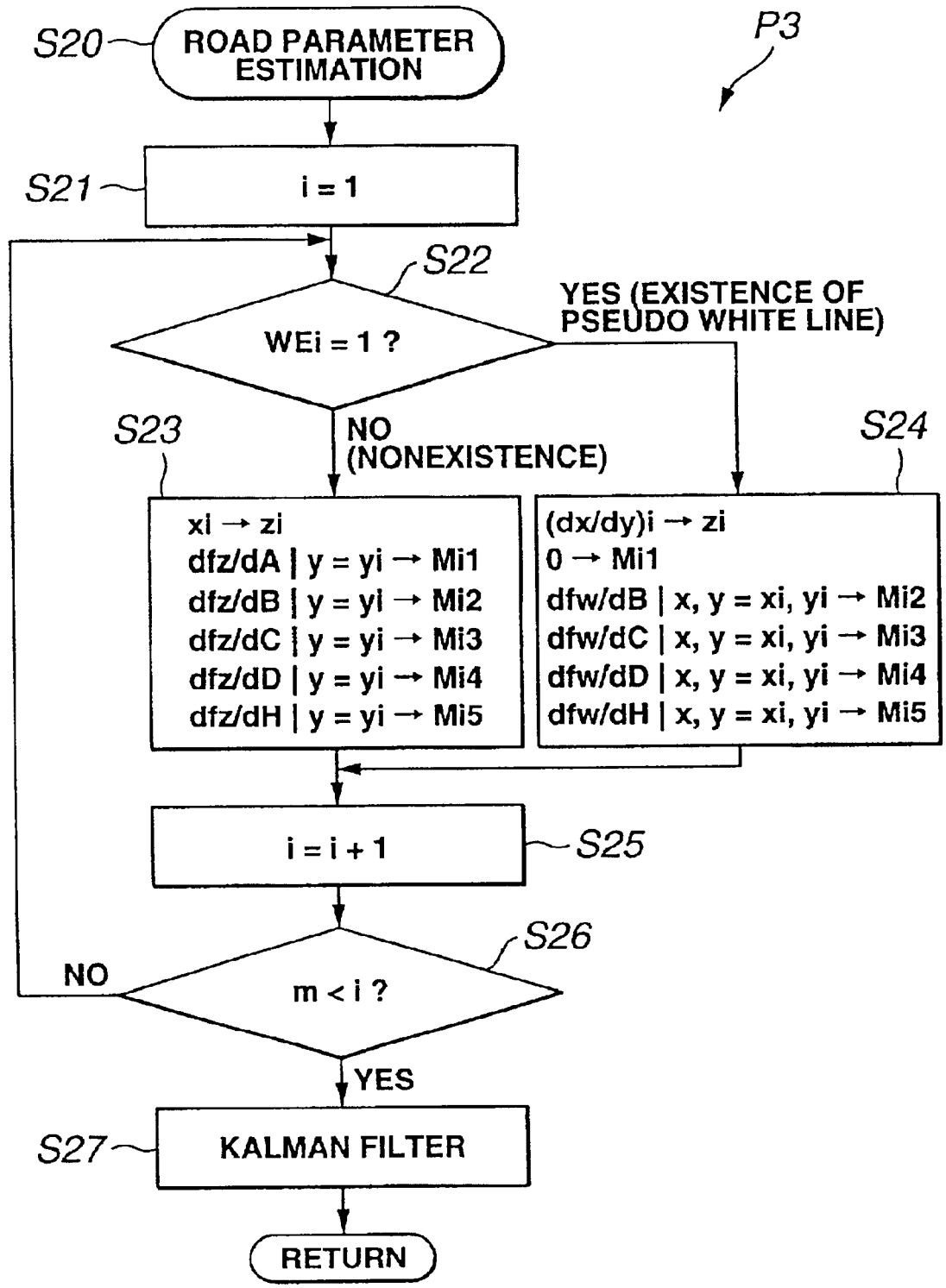
FIG. 4 is a flowchart of a road parameter estimating subroutine in the image processing program of FIG. 3.

FIGS. 3 and 4 show a program for estimating road parameters with the processor 16. In this example, the process is repeated at regular time intervals of 30 msec during running operation of the vehicle.

In the process in FIG. 3, first, a forward image of a road ahead the vehicle is taken from camera 14 to image memory 15 (step S1). Then, a plurality of (m) windows are set on the acquired image (step S2). The quantity m is the number of windows. A window processing number i is set at an initial value of 1 (step S3). Changes in luminance in the horizontal direction are detected from image data of the i-th window (hereinafter referred to as "window i") 20 to extract white line candidate points 21 for recognizing the position of an edge of a white line 18 (step S4). Then, a first candidate white line 22 having the highest probability of being a white line is calculated from those white line candidate points, based on the coordinate positions of the white line candidate points 21 in the window (step S5).

Pseudo white line presence judgment is then made to see whether there is a second candidate white line having a gradient similar to that of the first candidate white line in the window (step S6). If there is a second candidate white line according to the result of the judgment at step S6, a flag WEi for the window is set at 1 (step S7). If there no second candidate white line exists, flag WEi for the window is set at 0 (step S8). Then, window number i is incremented by 1 (step S9), and it is judged whether i has exceeded the number of the windows (m) (step S10). If not, the program returns to step S4 to process the next window. In this way, all the windows are subjected to preprocess or preparatory process. When all the windows are finished and hence i has exceeded the number of the windows (m), the program returns to the first step of acquiring an image in front of the vehicle (step S1) after performing a road parameter estimation process (step S20).

The processes of the above program will be described in detail on a step-by-step basis.

(1) Acquisition of Forward Image

At regular time intervals of the predetermined time length for repeating the program of FIG. 3, an image signal of a forward image in front of the vehicle formed by camera 14 is taken into image memory 15. The image is represented as luminance data of each pixel.

(2) Setting of a Plurality of Windows

Figure 5:
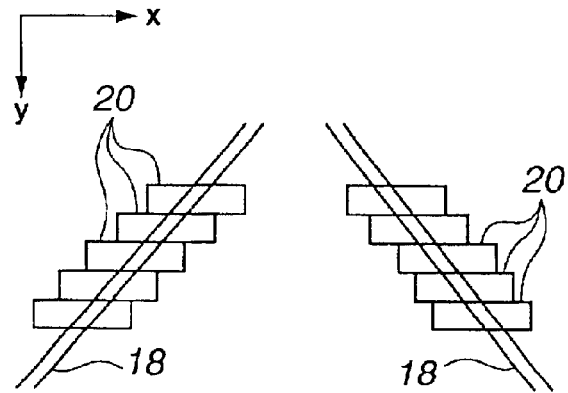
FIG. 5 is a view showing a plurality of windows used in the road lane marker recognition apparatus according to the first embodiment.

A plurality of windows 20 are arranged along a road white line (or each of left and right white lines), as shown in FIG. 5 (five windows for each white line on the left or right sides, in the example shown in FIG. 5). By using values of the parameters of the road model obtained in the previous execution of the program, the position of each window 20 is so determined that a white line 18 on the road is included in each of the windows 20, so that a white line 18 can be detected in each window 20. The vertical direction in FIG. 5 represents the direction of the y-axis of the image coordinate system. The positive direction of y extends downward in FIG. 5. The horizontal direction in FIG. 5 represents the direction of the x-axis of the image coordinates. The positive direction of x extends rightward in FIG. 5.

Let us assume here that the y-coordinate of the upper side 20a of the n-th window (i=n) is represented by yn and that the result of the previous parameter estimation is $\{A(-1), B(-1), C(-1), D(-1), H(-1)\}$. Then, from Equation 1, the coordinate xest of the lateral middle of the current window 20 along the lateral direction between the left and right ends is expressed by Equation 2.

$$xest = \left(\frac{-A(-1) + jE_0}{H(-1)}\right)(y_n + f \cdot D(-1)) - \frac{B(-1) \cdot H(-1) \cdot f^2}{(y_n + f \cdot D(-1))} - C(-1) \cdot f \quad \text{[Equation 2]}$$

The width of the window 20 in the x-direction may be a fixed value, or alternatively the window width may be determined from the variance of the parameters as disclosed in Published Japanese Application Publication (Kokai) No. 8(1996)-261756.

(3) Initialization of Window Number i

Loop control parameter i to ensure the preparatory process of steps S4 to S9 on all windows 20 is initialized to 1.

(4) Extraction of White Line Candidate Points

Figure 6:
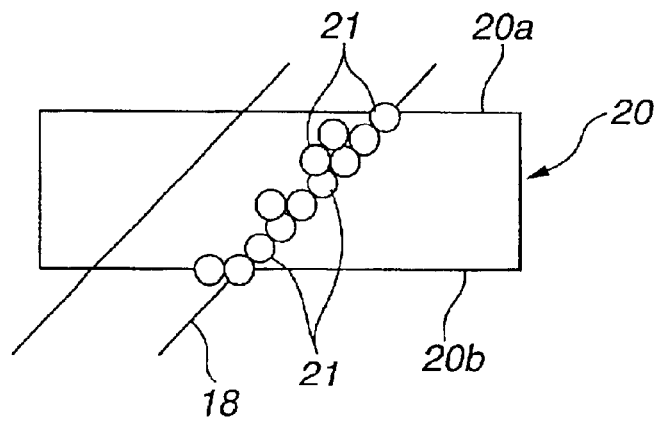
FIG. 6 is a view showing candidate white line points (or candidate lane marker points) in one window according to the first embodiment.

One or more white line candidate points are chosen from the image in the range of each window set in the image acquired by camera 14, by using an edge detecting (luminance change detecting) process such as a Sobel filtering process. In this edge detecting process, when the luminance of a left-hand pixel (with a smaller x-value in the image coordinates) is greater than the luminance of a right-hand pixel (with a greater x-value in the image coordinates), then the filter output is positive as shown in FIG. 6. In this example, the position of the inner side of a white line 18 having a certain width is regarded as the position of a white line 18. Accordingly, a point at which the filter output exceeds a positive discrimination value is regarded a white line candidate point in the case of the white line on the left, and a point at which the filter output is less than a negative discrimination value is regarded a white line candidate point in the case of the white line on the right. The entire image data in window 20 are scanned to extract white line candidate points by the filter output using the above-described discrimination values. The above-described discrimination values may be appropriately set depending on the average luminance, contrast, and so on of the entire image or each window.

(5) Calculation of Candidate White Line

Figure 7:
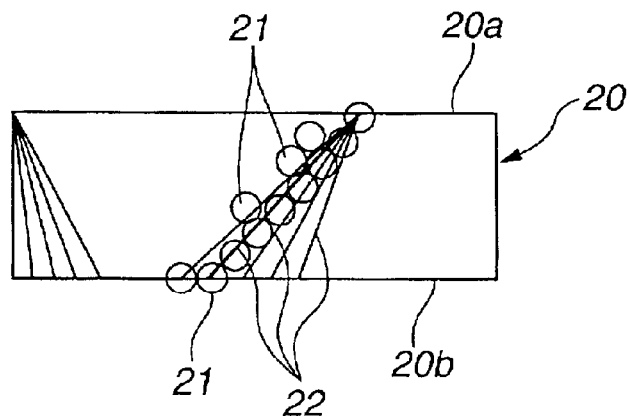
FIG. 7 is a view showing possible candidate white lines (or candidate lane markers) in one window according to the first embodiment.

Candidate white line 22 is searched from the set of white line candidate points 21 extracted from window 20. Hough transformation or the least squares method may be used for the search. This embodiment employs Hough transformation. In Hough transform straight line approximation, a straight line passing through the greatest number of white line candidate points 21 among straight lines passing through window 20 as shown in FIG. 7 is treated as a first candidate white line having the highest probability of being a white line.

A straight line passing through a coordinate point (x, y) can be expressed by the following Equation 3 using parameters a and b where a represents the gradient ($\partial x/\partial y$) of the candidate white line, and b represents an x-intercept of the candidate white line.

$$x=ay+b \quad \text{[Equation 3]}$$

Figure 8:
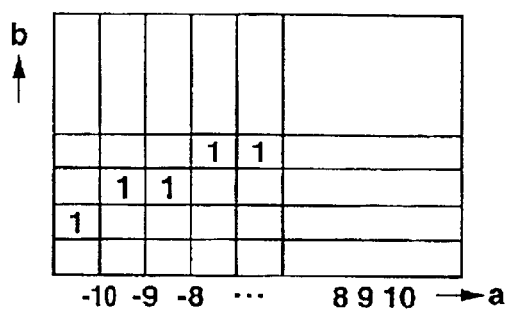
FIG. 8 is a table showing an array by Hough transform for searching a candidate white line (or candidate lane marker) according to the first embodiment.
Figure 9A:
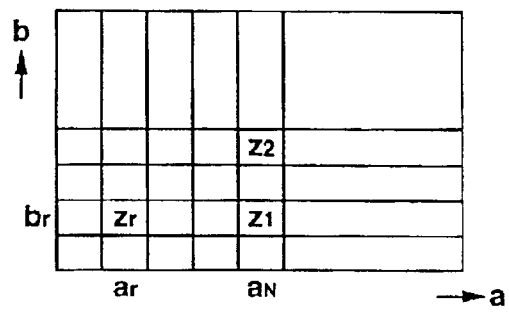
FIGS. 9A and 9B are tables for illustrating Hough transform in terms of array elements used in the first embodiment of the present invention.

Specifically, when a is determined and the coordinate of a candidate white point is given by (x, y), then it is possible to calculate the parameter b by using Equation 3, and thereby to obtain an array according to Hough transform as shown in FIG. 8. The table shows values of the parameter a with constant increments in the horizontal direction and shows values of the parameter b with constant increments in the vertical direction. The blank cells of the array represent zero. A true value is included in combinations (a, b) for which "1" is set. Such an array is created for every white line candidate point. The arrays thus created are superposed, and the values of each array element are totaled to obtain an array shown in FIG. 9A. The value zr of an array element (ar, br) in FIG. 9A represents the number of white line candidate points penetrated by a line of Equation 4.

$$x=a_r y+b_r \quad \text{[Equation 4]}$$

Therefore, a candidate white line passing through most white line candidate points is a first candidate white line having the highest probability that a candidate is a true white line, and the determination of a and b for that candidate white line amounts to the calculation of the first candidate white line. Namely, an array element (a, b) having a maximum array element value z represents a first candidate white line.

Figure 12:
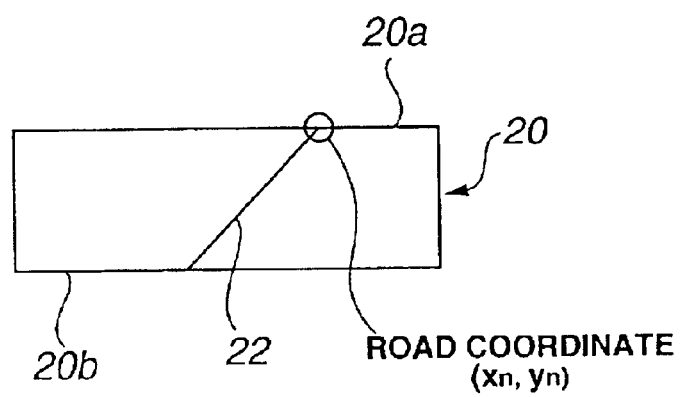
FIG. 12 is a view showing road coordinates of an intersection between a candidate white line and an upper side of a window set in the first embodiment.

When the candidate white line is thus calculated, then a road coordinate pair (xn, yn) is calculated. The road coordinates (xn, yn) are the coordinates of an intersection between the first candidate white line 22 and the window upper side 20a in the window No. n, as shown in FIG. 12. The y-coordinate yn of upper side 20a of window 20 is a value fixed for the window No. n. The x-component xn of the road coordinates is calculated using Equation 5.

$$x_n = a_n y_n + b_n \quad \text{[Equation 5]}$$

(6) Judgment of Presence of Pseudo White Line

Judgment on presence of pseudo white line is made based on the array shown in FIG. 9A. This judgment is to examine whether any second candidate white line having a gradient approximately equal to that of the first candidate white line (,so that a gradient difference between the gradients of both lines is equal to or smaller than a predetermined value) exists in the image in the window, to see whether any pseudo white line exists in the window. When, for example, a pseudo white line, such as a white guide rail or a region of high luminance generated by reflection from water collected in a wheel track is included in the image in the window, edges of such a pseudo white line in the horizontal directions are also extracted as white line candidate points as a result of the above-described edge detection. Therefore, the white line candidate points may include true white line candidate points indicating the right or left edge of a white line and false white line candidate points originating from the pseudo white line.

In addition to a first candidate white line that is a candidate white line having the highest probability of a true white line, a second candidate white line having a gradient similar to that of the first candidate white line is calculated from image data of a window including one or more pseudo white lines.

Depending on the conditions of the road, a candidate white line calculated from white line candidate points originating from a pseudo white line can be chosen as a first candidate white line having the highest probability of being the white line instead of a true white line. In such a case, the presence of any pseudo white line is checked in order to prevent introduction of error in the estimation of road parameters even if a pseudo white line is erroneously recognized as a first candidate white line. In estimating road parameters as described later, an equation including road parameters other than a vehicle lateral displacement relative to the lane is used for a window which is judged as having a pseudo white line.

Referring to the parameter a indicating the gradients of candidate white lines in the array in FIG. 9A, the values in each column are totaled, and the maximum sum is chosen. If a plurality of candidate white lines having a gradient difference equal to or smaller than a predetermined value on the image are found in this process, one of such candidates is selected. The predetermined value is set because a true white line and a pseudo white line in parallel therewith are not parallel on the image, and the value is determined by the maximum value of the distance between the true white line on the road and the pseudo white line to which the process is to be applied and by the camera height H.

Figure 9B:
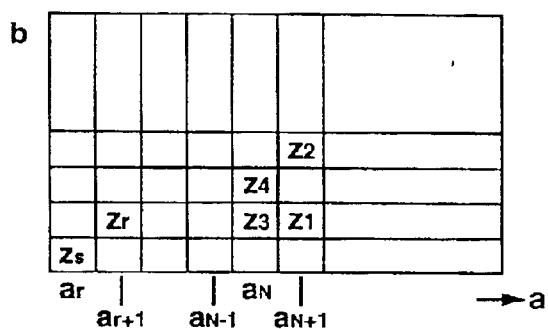

The selected value of the parameter a is represented by $a_N$, and the variance of b (x-intercepts) in the column of the value $a_N$ is calculated. If the predetermined value is greater than the interval of the parameter a (e.g., $|a_r - a_{r-1}|$), when the values in each column is totaled, the maximum sum is selected by obtaining sums, including adjacent columns (e.g., $a_{N-1} \sim a_{N+1}$) until the range of a exceeds the predetermined value as shown in FIG. 9B, and the variance of b is calculated in the columns of $a_N$.

Figure 10:
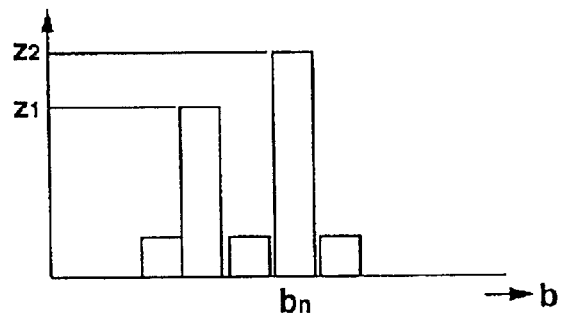
FIG. 10 is a graph for illustrating a peak frequency when there exists a pseudo white line (or pseudo lane marker) obtained by Hough transform in the first embodiment.

If the variance of b is equal to or smaller than a predetermined value, it is judged that no second candidate white line having a gradient similar to that of the first candidate white line or no pseudo white line exists. Otherwise, it is judged that a pseudo white line exists. If a pseudo white line exists, a plurality of peaks appear as shown in FIG. 10, resulting in greater variance. A set of windows n judged as having a pseudo white line are represented by Ga, and a set of windows n having no pseudo white line are represented by Gb.

Figure 11:
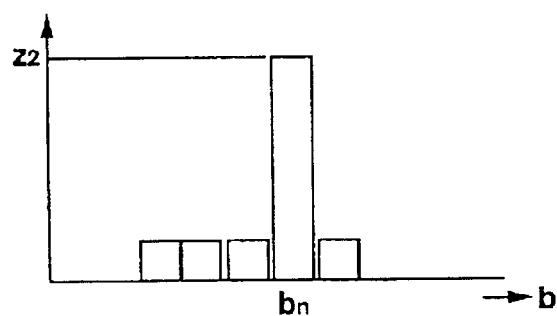
FIG. 11 is a graph for illustrating a peak frequency when there exists no pseudo white line obtained by Hough transform in the first embodiment.
Figure 15:
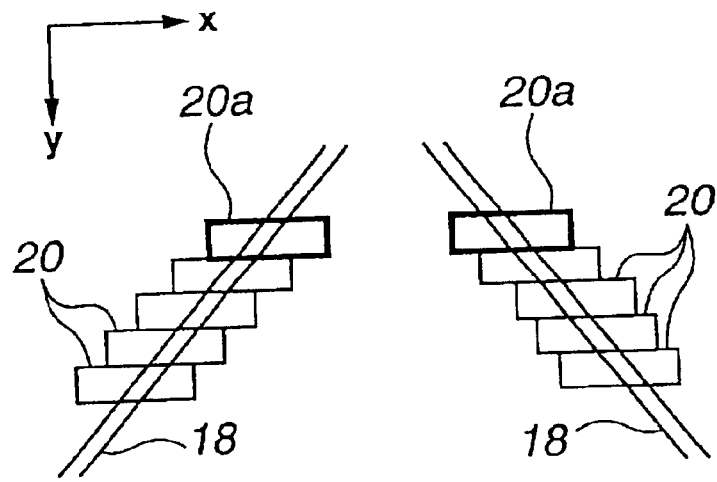
FIG. 15 is a view for illustrating faraway windows which are judged lower in accuracy in the second embodiment.
Figure 16:
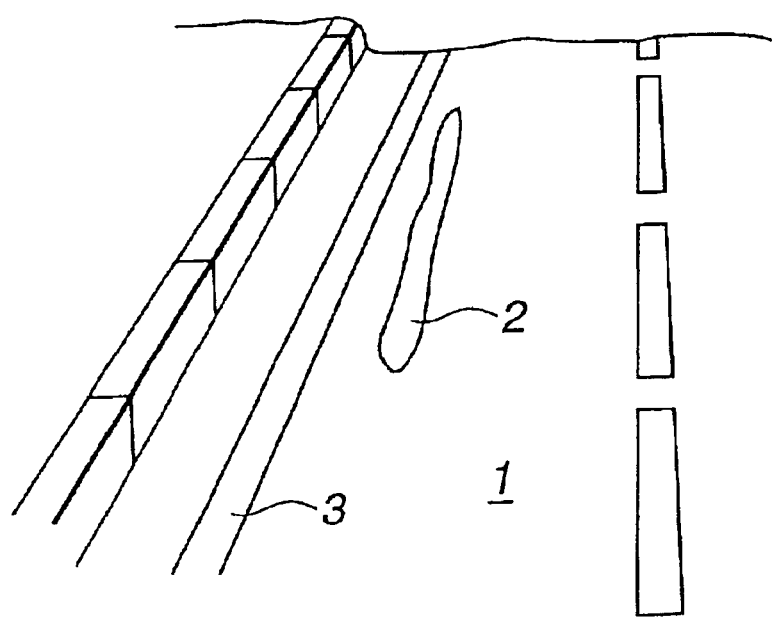
FIG. 16 is a perspective view illustrating a road formed with a rut along a road white line so that a pseudo white line can be produced.

Then, as shown in FIG. 11, the value of b corresponding to the greatest one in the column of $a_N$ (bn in FIG. 11) is selected. Thus, a pair of a and b which defines a first candidate white line having the highest probability of being a white line is selected. At this time, a pair of a and b defining a pseudo white line instead of a true white line may be erroneously selected as a first candidate white line if white line 18 on the road is partially faded, or there is a white guard rail, or light is continuously reflected by water collected in a rut, as shown in FIGS. 15 and 16.

(7) Setting of Judgment Flag Indicating the Presence of Pseudo White Line

Flag WEi of a window is set at "1" when it is judged as having a pseudo white line as a result of judgment on the presence of a pseudo white line at step S7, and flag WEi of a window is set at "0" when it is judged as having no pseudo white line. This flag is referred to during the estimation of road parameters to be described later.

(8) Estimation of Road Parameters

Equation 1 is differentiated by y to obtain Equation 6.

$$\frac{\partial x}{\partial y} = \left(\frac{-A + jE_0}{H}\right) + \frac{B \cdot H \cdot f^2}{(y_n + f \cdot D)^2} \qquad \text{[Equation 6]}$$

Equation 7 is obtained by eliminating A from Equations 1 and 6.

$$\frac{\partial x}{\partial y} = \left(\frac{x_n + C \cdot f}{y_n + f \cdot D}\right) + \frac{2 \cdot B \cdot H \cdot f^2}{(y_n + f \cdot D)^2} \qquad \text{[Equation 7]}$$

At this time, A represents a parameter of the lateral position of the vehicle relative to the lane, and E0 representing the lane width is eliminated at the same time when A is eliminated. That is, Equation 7 is satisfied for any road width. In other words, Equation 7 is satisfied by any line segment which is in parallel with white line 18 on the road without using true white line 18 on the road. Specifically, in practice, a pseudo white line originating from a guide rail, reflection of light from water collected in a rut, a double white line, or the like is frequently in parallel with a true white line 18 on the road. When such a pseudo white line is detected, road parameters excluding A (parameters B, C, D, and H) can be accurately estimated from the gradient of the pseudo white line ($\partial x/\partial y$), the road coordinates (x, y), and Equation 7 using a technique such as the least squares method or Kalman filter. Parameter A may be estimated from the data of a window in which no pseudo white line exists along with other parameters.

When Kalman filter is used for the estimation of the parameters, a parameter z can be estimated from an equation expressed as Equation 8 below. A value of parameter yy and the structure of f in the same equation are known, and yy is in the form of a vector in general.

$$yy = f(z) \qquad \text{[Equation 8]}$$

A description will now be made on derivation of an observation equation (so called) corresponding to Equation 8 in the case wherein a pseudo white line exists and the case wherein no pseudo white line exists.

(1) When a pseudo white line exists, Equation 7 is used, and Equation 9 is satisfied because the left side of Equation 7 represents a gradient on an image.

$$a_n = \left(\frac{x_n + C \cdot f}{y_n + f \cdot D}\right) + \frac{2 \cdot B \cdot H \cdot f^2}{(y_n + f \cdot D)^2}, \quad n \in Ga \qquad \text{[Equation 9]}$$

Equation 9 can be rewritten as follows.

$$\partial x/\partial y = fw\ (B, C, D, H) \qquad \text{Equation 9'}$$

(2) When no pseudo white line exists, the above-mentioned Equation 1 holds as Equation 10.

$$x_n = \left(\frac{-A + jE_0}{H}\right)(y_n + f \cdot D) - \frac{B \cdot H \cdot f^2}{(y_n + f \cdot D)} - C \cdot f, \qquad \text{[Equation 10]}$$

$$n \in Gb$$

Equation 10 can be rewritten as follows.

$$x = fz\ (A, B, C, D, H) \qquad \text{Equation 10'}$$

In general, Equations 9' and 10' are constituted by a plurality of columns. These are subjected to linear approximation and arranged to provide Determinant 11 shown below.

$$\begin{bmatrix} z1 \\ z2 \\ \vdots \\ z_m \end{bmatrix} = \begin{bmatrix} M_{11} & M_{12} & M_{13} & M_{14} & M_{15} \\ M_{21} & M_{22} & M_{23} & M_{24} & M_{25} \\ \vdots & \vdots & \vdots & \vdots & \vdots \\ M_{m1} & M_{m2} & M_{m3} & M_{m4} & M_{m5} \end{bmatrix} \begin{bmatrix} A \\ B \\ C \\ D \\ H \end{bmatrix} \quad \text{[Equation 11]}$$

In Determinant 11, m indicates the number of windows set in one screen. When window No. n belongs to Ga (a set of windows having therein a pseudo white line), $zn=(\partial x/\partial y)n=an$, and Mn1 is zero. When window No. n belongs to Gb (a set of windows having therein no pseudo white line), $zn=xn$. (Each of the sets Ga and Gb is a subset of a set of the windows m in number.)

Subroutine P3 for the process of estimating road parameters will now be described with reference to FIG. 4.

First, window number parameter i is initialized to 1 (i=1) at step S21. Then, the value of flag WEi associated with window No. i is checked at step S22 to branch to a process on a window in which a pseudo white line exists or a process on a window in which no pseudo white line exists.

In the case of a window in which no pseudo white line exists, at step S23, zi in Equation 11 is set at xi, and the right side of Equation 10 is linearly approximated to respectively set Mi1, Mi2, Mi3, Mi4, and Mi5 at dfz/dA, dfz/dB, dfz/dC, dfz/dD, and dfz/dH at y=yi. In FIG. 4, {Q |x=xi, y=yi} represents Q in the case that x is equal to xi and y is equal to yi.

In the case of a window in which a pseudo white line exists, at step S24, zi in Determinant 11 is set at (dx/dy)i, and the right side of Equation 9 is linearly approximated to respectively set Mi1 at 0, and Mi2, Mi3, Mi4, and Mi5 at dfw/dB, dfw/dC, dfw/dD, and dfw/dH for which the values of x and y are (xi, yi).

Then, the window number i is incremented by 1 at step S25, and it is judged at step S26 whether window No. i has exceeded the number of windows m. If the number of windows m has not been exceeded, the program returns to step S22 to process the next window. If the number of windows m has been exceeded, parameters (A, B, C, D, H) are estimated by the Kalman filter process at step S27, and then the process returns to the main routine.

Figure 13:
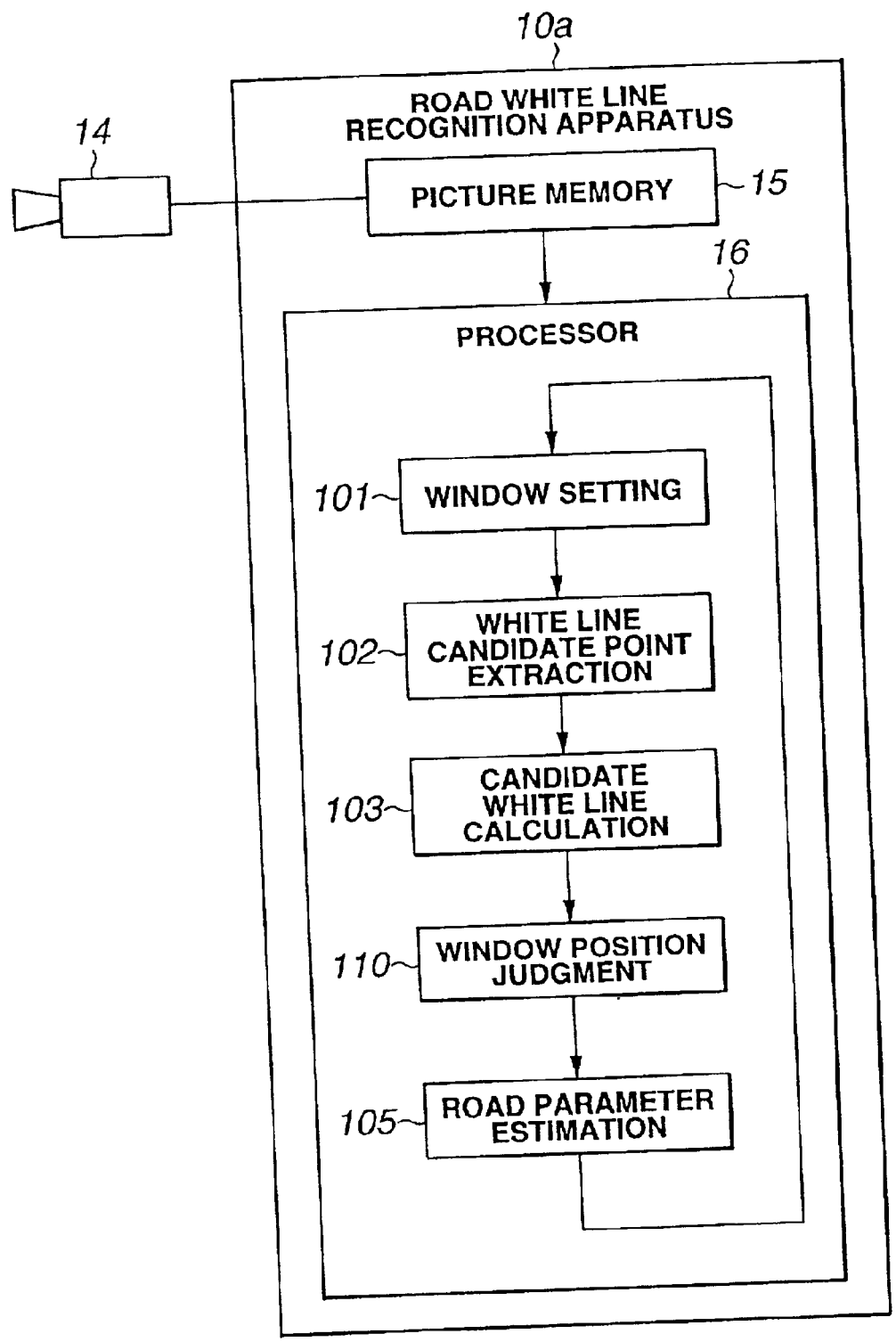
FIG. 13 is a schematic view showing a road lane marker recognition apparatus according to a second embodiment of the present invention.

FIG. 13 is shows a configuration of a second embodiment of a road white line recognition apparatus according to the invention. In FIG. 13, a road white line recognition apparatus 10a includes an image memory 15 for storing an image of a road in front of a vehicle acquired by an imaging device 14 loaded on the vehicle, and a processor 16 for estimating road parameters based on the image of the road stored in image memory 15, as in the preceding embodiment.

Processor 16 has a window setting section 101 for providing a plurality of windows on the road image stored in image memory 15 in the direction in which a white line on the road extends such that the white line on the road is included in each of the windows, a white line candidate point extracting section 102 for processing the image in each of the windows to extract candidate points for the white line, a candidate white line calculating section 103 for calculating the coordinates and gradient of an image of a candidate white line having the highest probability of being the white line based on the white line candidate points extracted in each of the windows, a window position judging section (white line position accuracy judging means) 110 for judging the distance between the road surface in each of the window and the vehicle, and a road parameter estimation section 105 for estimating road parameters including at least lateral displacement of the vehicle relative to the lane using the image coordinates and gradient of the image of the candidate white line calculated in each of the windows and a road model equation.

Road parameter estimation section 105 estimates the road parameters including the vehicle lateral displacement of the vehicle relative to the lane by using the image coordinates and gradient of the candidate white line for a window in which the road surface is judged to be located far from the vehicle, and by using the image coordinates of the candidate white line for a window in which the road surface is judged to be not far from the vehicle.

The road model equation and road parameters in the second embodiment are substantially identical to those used in the first embodiment.

Figure 14:
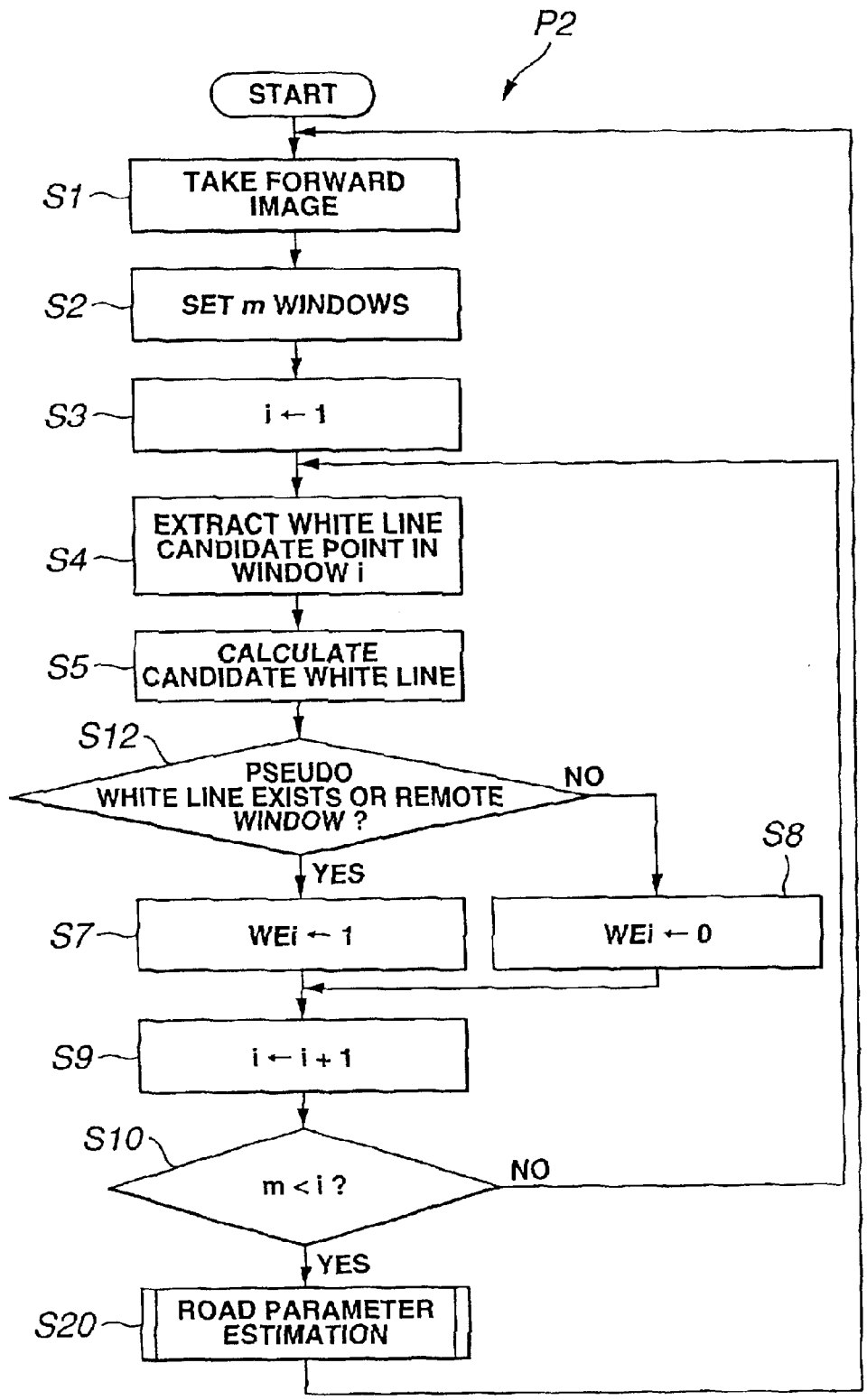
FIG. 14 is a flowchart of an image processing program according to the second embodiment.

While operations in the program P2 in the present embodiment shown in FIG. 14 are substantially identical to those of program P1 executed in the flowchart in FIG. 3 described in the first embodiment, in the present embodiment, an observation equation selecting operation is performed at step S12 instead of step S6 of program P1 in the first embodiment, and the operation at step S12 will be described below. Operations in the flowchart in FIG. 14 identical to those in the flowchart in FIG. 3 are indicated by like step numbers and will not be described repetitively.

Selection of Observation Equation

Group Ga or Gb is selected for a window having a window number n as in the first embodiment. For group Ga, the observation equation is given by Equation 9 (Equation 9'). In the case of group Gb, the observation equation is expressed by Equation 10 (Equation 10'). In the first embodiment, Ga is selected when it is judged that a pseudo white line exists. In the second embodiment, Ga is selected not only when it is judged that a pseudo white line exists but also when a candidate white line 22 is judged in a faraway window 20a remote from the vehicle. In this example, the faraway window is the uppermost window 20a shown by a bold line in FIG. 15. It is optional, however, to regard a plurality of consecutive windows in an upper part including the uppermost window as faraway windows to be included in the group Ga.

According to the second embodiment, a gain G of parameter A with respect to a change in xn can be obtained as Equation 12 from Equation 1.

$$G = \left( \frac{H}{y_n + f \cdot D} \right) \quad \text{[Equation 12]}$$

In Equation 12, yn represents the coordinate along the vertical axis, and the value of yn decreases with the distance from the vehicle. Since yn appears in the denominator of G, G increases with increase in the distance from the vehicle. This means that an error on the image results in greater influence in the estimation of parameter A for window 20 which is located further from the vehicle. In practice, since the resolution of an image is unchanged regardless of the distance, the accuracy of estimation of parameter A is lower for window 20 for seeing a greater distance. Therefore, the accuracy of estimation of a road model can be improved by not estimating parameter A in window 20a for a great distance for which reduction in the estimating accuracy of parameter A is predicted.

In each of the above embodiments, candidate white line 22 in window 20 is treated as a straight line for approximation, and such a straight line approximation makes it possible to increase the speed of the process. Specifically, if candidate white line 22 is approximated to a high-order curve, the approximating process itself requires an enormous time for calculation, and a process for calculating gradients on the image will be required. While a gradient must be re-calculated by specifying the coordinates in the case of a curve, the gradient of a straight line is determined during the process of approximation. Therefore, the size of windows 20 may be set such that white line 18 on a road can be approximated to a straight line in each of windows 20 even when white line 18 is a curved line.

Since Hough transformation is used in approximating candidate white line 22 to a straight line, when a plurality of candidate white lines 22 are acquired, there is no need for re-calculating the gradients of the plurality of candidate white lines on the image, which makes it possible to increase the speed of the process. This is advantageous in a system for which high speed processing is required such as a vehicle traveling at a high speed.

Figure 17:
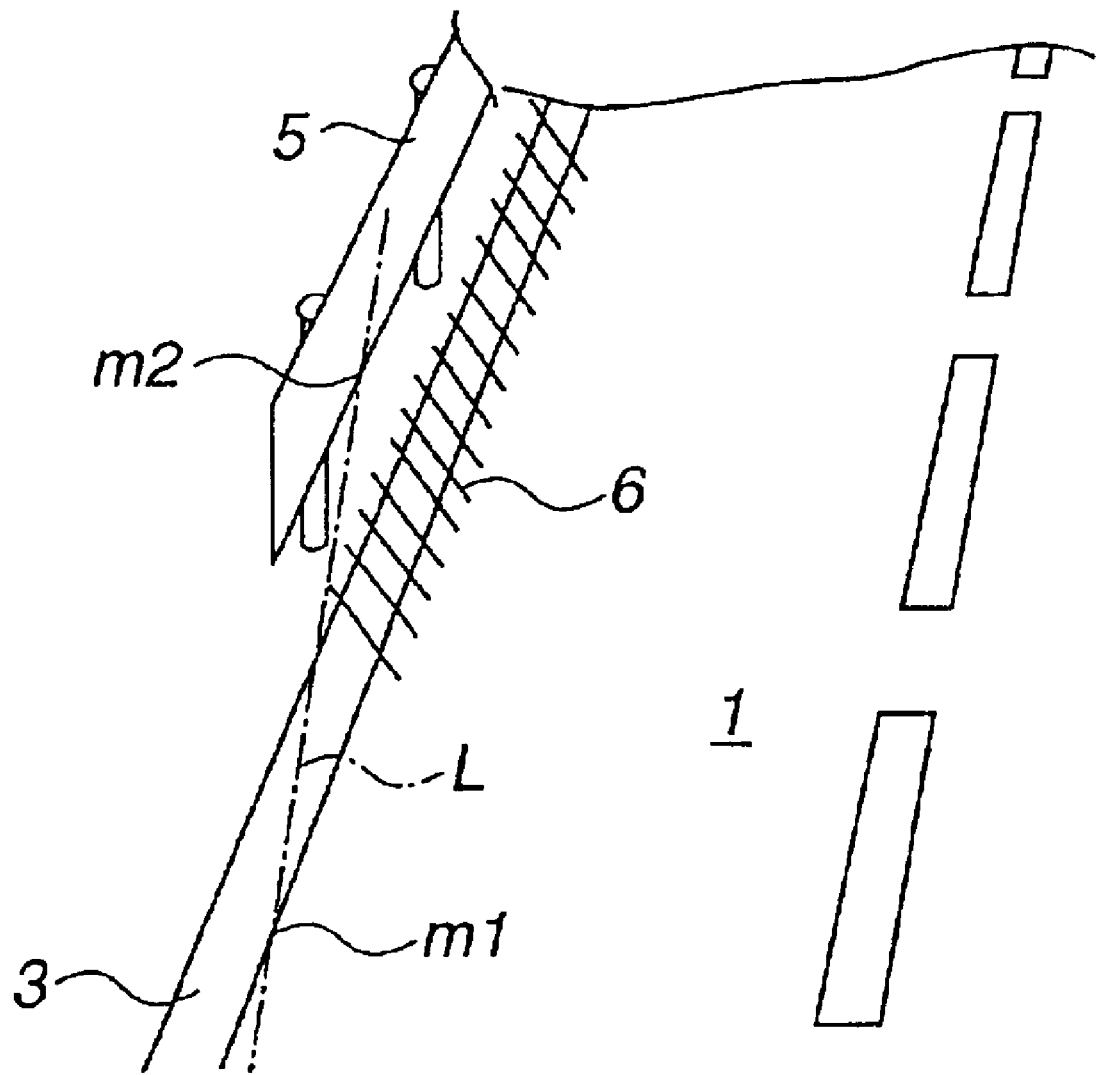
FIG. 17 is a perspective view illustrating a road with a guard rail which can cause a pseudo white line.

FIG. 16 shows a road 1 formed with a rut 2 in which water is collected. Sunlight or streetlight can cause reflection from the surface of a pool (or water film) in dependence on the incident angle, and appear, in an electronic image, as a high luminance line resembling a road white line 3. FIG. 17 shows a white guardrail 5 and a white line 3 extending in the shade 6 of the guardrail 5. In this case, the luminance of the white line in the shade 6 is decreased, and the white guardrail 5 and an unshaded part of the white line 3 could cause misrecognition, as a road model, of a line L connecting a detection point m1 on the unshaded white line segment and a pseudo detection point m2 on the guardrail 5. The white line recognition system according to the present invention can avoid such misrecognition by treating each window or the window of the subset Ga in a first mode (S24) and treating each window or the window of the subset Gb in a second mode (S23).

This application is based on prior Japanese Patent Application No. 2000-301453 filed on Sep. 29, 2000, and prior Japanese Patent Application No. 2001-179204 filed on Jun. 13, 2001. The entire contents of these Japanese Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A road lane marker recognition apparatus for obtaining a forward road image of a road ahead of a vehicle with an imaging device and estimating road parameters of a road model equation, the recognition apparatus comprising a processor:

to set, in the road image, a plurality of windows along a road lane marker on the road so that the road lane marker is contained in each window;

to calculate a candidate lane marker which is likely to be the road lane marker in each window;

to judge an accuracy in determining the position of the candidate lane marker with respect to the road lane marker in each window; and to estimate the road parameters of the road model equation representing a road shape of the road and vehicle attitude with respect to the road, the processor being configured to estimate the road parameters inclusive of a vehicle lateral displacement, by using at least a gradient of the candidate lane marker for one window judged to be lower in the accuracy, and by using an image coordinate of the candidate lane marker for one window judged to be higher in the accuracy.

2. The recognition apparatus as claimed in claim 1, wherein the processor is configured to examine each window to determine whether there is a pseudo lane marker approximately equal in gradient to the candidate lane marker, and to judge a window to be lower in the accuracy if there is the pseudo lane marker, and to be higher in the accuracy if there is not the pseudo lane marker.

3. The recognition apparatus as claimed in claim 1, wherein the processor is configured to judge the accuracy of each window in accordance with a distance of a road region in the window from the vehicle, and to judge a window to be lower in the accuracy if the distance is greater, and to be higher in the accuracy if the distance is smaller.

4. The recognition apparatus as claimed in claim 1, wherein the processor is configured to extract candidate lane marker points by processing the image in each window, and to calculate the candidate lane marker from the candidate lane marker points in each window.

5. The recognition apparatus as claimed in claim 1, wherein the processor is configured to calculate the candidate lane marker in each window by straight line approximation.

6. The recognition apparatus as claimed in claim 4, wherein the processor is configured to calculate the candidate lane marker by straight line approximation using Hough transform from the candidate lane marker points in each window.

7. The recognition apparatus as claimed in claim 1, wherein the processor is configured to subject an equation obtained by eliminating the vehicle lateral displacement from the road model equation, to linear approximation about the parameters, for a window judged to be lower in the position accuracy, and to subject the road model equation to linear approximation about the parameters, for a window judged to be higher in the position accuracy, to estimate the road parameters by Kalman filter operation.

8. The recognition apparatus as claimed in claim 1, wherein the road parameters comprise a road curvature, a yaw angle of the vehicle with respect to a road lane, a pitch angle of the vehicle, and a height of the imaging device from a ground level.

9. The recognition apparatus as claimed in claim 1, wherein the processor is configured to classify the windows into a higher accuracy window subset and a lower accuracy window subset in accordance with the position accuracy, and the processor is further configured to estimate the road parameters exclusive of the vehicle lateral displacement, by using the gradient of the candidate lane marker for each window or the window of the lower accuracy window subset, and to estimate the road parameters inclusive of the vehicle lateral displacement for each window or the window of the higher accuracy window subset.

10. A road lane marker recognition process comprising:

obtaining a forward road image of a road ahead of a vehicle;

setting, in the road image, a series of windows arranged along a road lane marker on the road so that the road lane marker is contained in each window;

calculating a candidate lane marker which is likely to be the lane marker in each window;

judging a position accuracy in position of the candidate lane marker with respect to the road lane marker in each window; and estimating road parameters of a road model equation representing a road shape of the road and vehicle attitude with respect to the road, the road parameters inclusive of a vehicle lateral displacement being estimated by using at least a gradient of the candidate lane marker for one window judged to be lower in the position accuracy, and by using an image coordinate of the candidate lane marker for one window judged to be higher in the position accuracy.

11. A road lane marker recognition apparatus comprising:

means for setting, in a forward road image of a road ahead of a vehicle, a series of windows along a road lane marker on the road so that the road lane marker is contained in each window;

means for calculating a candidate lane marker which is likely to be the road lane marker in each window;

means for judging a position accuracy in position of the candidate lane marker in each window; and means for estimating road parameters of a road model equation, inclusive of a vehicle lateral displacement, by using at least a gradient of the candidate lane marker for one window judged to be lower in the position accuracy, and by using an image coordinate of the candidate lane marker for one window judged to be higher in the position accuracy.

* * * * *